US006654836B1

(12) United States Patent
Misra et al.

(10) Patent No.: US 6,654,836 B1
(45) Date of Patent: Nov. 25, 2003

(54) DUAL MASTER DEVICE FOR IMPROVED UTILIZATION OF A PROCESSOR LOCAL BUS

(75) Inventors: Ashutosh Misra, Bangalore (IN); Seetharam Gundu Rao, Bangalore (IN); Anil Shrikant Keste, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 09/597,769

(22) Filed: Jun. 20, 2000

(51) Int. Cl.$^7$ ................................................ G06F 13/00
(52) U.S. Cl. ..................... 710/110; 709/208; 710/309
(58) Field of Search .................... 710/58, 100, 107, 710/110, 240, 241, 309; 709/208

(56) References Cited

U.S. PATENT DOCUMENTS

| | | | | |
|---|---|---|---|---|
| 5,925,118 A | * | 7/1999 | Revilla et al. | 710/110 |
| 6,032,238 A | * | 2/2000 | Green et al. | 711/170 |
| 6,081,860 A | * | 6/2000 | Bridges et al. | 710/110 |
| 6,430,641 B1 | * | 8/2002 | Hofmann et al. | 710/240 |
| 6,513,089 B1 | * | 1/2003 | Hofmann et al. | 710/309 |

FOREIGN PATENT DOCUMENTS

| | | | | |
|---|---|---|---|---|
| JP | 57-039439 | 3/1982 | ............ | G06F/3/00 |
| JP | 01-248264 | 10/1989 | ............ | G06F/13/28 |
| JP | 02-025958 | 1/1990 | ............ | G06F/13/36 |
| JP | 02-407533 | 12/1990 | ............ | G06F/13/36 |
| JP | 03-177953 | 8/1991 | ............ | G06F/13/28 |

\* cited by examiner

*Primary Examiner*—Xuan M. Thai
(74) *Attorney, Agent, or Firm*—T. Rao Coca; Manny W. Schecter; Anthony V. S. England (57) ABSTRACT

A dual master apparatus for mastering a Processor Local Bus (PLB), which is a high-performance, on-chip bus used in many System on Chip (SOC) applications, supporting up to 16 masters. The apparatus includes a first circuit for generating an address phase for read data coupled to the PLB, and a second circuit for generating an address phase for write data coupled to the PLB. The second address phase generating circuit is adapted to carry out a write operation when the write data bus is idle and the read data bus is busy, and vice versa. The first and second address phase generating circuits can simultaneously process read and write requests. The apparatus also may include circuits for handling read and write data coupled to the first and second address generating circuits, respectively. Further, the apparatus may include circuits for requesting read and write data coupled to the read- and write-data handling circuits, respectively.

18 Claims, 6 Drawing Sheets

DUAL MASTER DEVICE FOR IMPROVED UTILIZATION OF A PROCESSOR LOCAL BUS

FIELD OF THE INVENTION

The present invention relates generally to system-on-a-chip (SOC) applications and more particularly to on-chip buses used in such SOC applications.

BACKGROUND

Recent advances in silicon densities allow for the integration of numerous functions onto a single silicon chip. With this increased density, peripheral devices formerly attached to a processor at the card level are integrated onto the same die as the processor. As a result, chip designers must address issues traditionally handled by system designers. This type of implementation of a complex circuit on a single die is referred to as a system-on-a-chip (SOC).

Typically, an SOC contains numerous functional blocks representing a large number of logic gates. Design of such a system is realized through a macro-based approach. Macro-based design facilitates logic entry and verification, as well as re-use of macros with particular functionality. A macro is a re-usable tested design available in a library in the form of a netlist. In applications ranging from generic serial ports to complex memory controllers and processor cores, each SOC uses a number of common macros. A core is a re-usable tested design in any hardware description language like VHDL or Verilog.

Many single-chip solutions used in such applications are designed as custom chips, each with its own internal architecture. Logical units within such a chip are often difficult to extract and re-use in different applications. As a result, the same function is re-designed many times from one application to another.

Thus, a need clearly exists for an improved architecture for an on-chip bus used in such SOC implementations that is flexible and robust to support a wide variety of embedded system requirements.

SUMMARY

In accordance with a first aspect of the invention, there is provided an apparatus for mastering a Processor Local Bus (PLB) having read and write data buses. The apparatus includes a first module for generating an address phase for read data coupled to the PLB and a second module for generating an address phase for write data coupled to the PLB. The second address phase generating module is adapted to carry out a write operation when the write data bus is idle and the read data bus is busy, and vice versa. Preferably, the first and second address phase generating module are adapted to simultaneously process read and write requests. The apparatus may also include a module for handling read data coupled to the first address phase generating module and a module for handling write data coupled to the second address phase generating module. Still more preferably, the apparatus includes a module for requesting read data coupled to the read-data handling module and a module for requesting write data coupled to the write-data handling module.

In accordance with a second aspect of the invention, there is provided a system on a chip. The system includes:
 a processor local bus (PLB);
 an arbiter coupled to the PLB; and
 at least two masters coupled to the PLB, a first master of the at least two masters including: a first module for generating a first address phase for read data coupled to the PLB; and a second module for generating a second address phase for write data coupled to the PLB. The second address phase generating module is adapted to carry out a write operation when the write data bus is idle and the read data bus is busy, and vice versa.

In accordance with a third aspect of the invention, there is provided a method for mastering a Processor Local Bus (PLB) having read and write data buses. The method includes the steps of: generating a first address phase for read data coupled to the PLB; and generating a second address phase for write data coupled to the PLB. The second address phase generating step is able to carry out a write operation when the write data bus is idle and the read data bus is busy, and vice versa.

In accordance with a fourth aspect of the invention, there is provided a method for providing a system on a chip. The system has a processor local bus (PLB), an arbiter coupled to the PLB, and at least two masters coupled to the PLB. The method includes the steps of: generating a first address phase for read data provided via the PLB; and generating a second address phase for write data provided via the PLB. The second address phase generating step is able to carry out a write operation when the write data bus is idle and the read data bus is busy, and vice versa.

In accordance with a fifth aspect of the invention, there is provided a computer program product having a computer readable medium having a computer program recorded therein for mastering a Processor Local Bus (PLB) having read and write data buses. The computer program product includes: a computer program code module for generating a first address phase for read data via the PLB; and a computer program code module for generating a second address phase for write data via the PLB. The second address phase generation is capable of carrying out a write operation when the write data bus is idle and the read data bus is busy, and vice versa.

In accordance with a sixth aspect of the invention, there is provided a computer program product having a computer readable medium having a computer program recorded therein for providing a system on a chip, the computer program product including:
 a computer program code module for providing a processor local bus (PLB);
 a computer program code module for providing an arbiter coupled to the PLB; and
 a computer program code module for providing at least two masters coupled to the PLB, a first master of the at least two masters including:
  first means for generating a first address phase for read data coupled to the PLB;
  second means for generating a second address phase for write data coupled to the PLB, the second address phase generating means adapted to carry out a write operation when the write data bus is idle and the read data bus is busy, and vice versa.

BRIEF DESCRIPTION OF THE DRAWINGS

Embodiments of the invention are described hereinafter with reference to the drawings, in which.

DETAILED DESCRIPTION

A method, an apparatus and a computer program product for mastering a processor local bus (PLB) having read and write data buses are described. In the following description, numerous details are set forth. It will be apparent to one skilled in the art, however, that the present invention may be practiced without these specific details. In other instances, well-known features are not described in detail so as not to obscure the present invention.

The embodiments of the invention are generally directed to on-chip buses used in SOC designs and are flexible and robust, so as to support a wide variety of embedded system needs. In particular, common buses are used for inter-macro communications, so as to promote re-use of logical units in such an SOC application by ensuring macro inter-connectivity. To this end, three buses are utilised for inter-connecting cores, library macros, and custom logic. Those buses include a processor local bus (PLB), an on-chip peripheral bus (OPB), and a device control register (DCR) bus.

The processor local bus (PLB) is a high performance, on-chip bus used in many system on chip (SOC) applications. The PLB consists of a PLB core (arbiter, control and gating logic) to which masters and slaves are attached. The PLB architecture supports up to 16 masters. Depending on the complexity of a particular system, the PLB core is designed or chosen from standard libraries. Generally, the PLB cores provided in the standard libraries support 4/8 masters or up to 16 masters. A master can perform read and write operations at the same time after doing address pipelining, because the PLB architecture has separate read and write buses. However, the PLB architecture cannot initiate requests for both a read and a write at the same time. In a given system on chip (SOC) application, PLB bus utilization can be improved using the overlapped read and write transfer feature of the PLB architecture.

Figure 1:
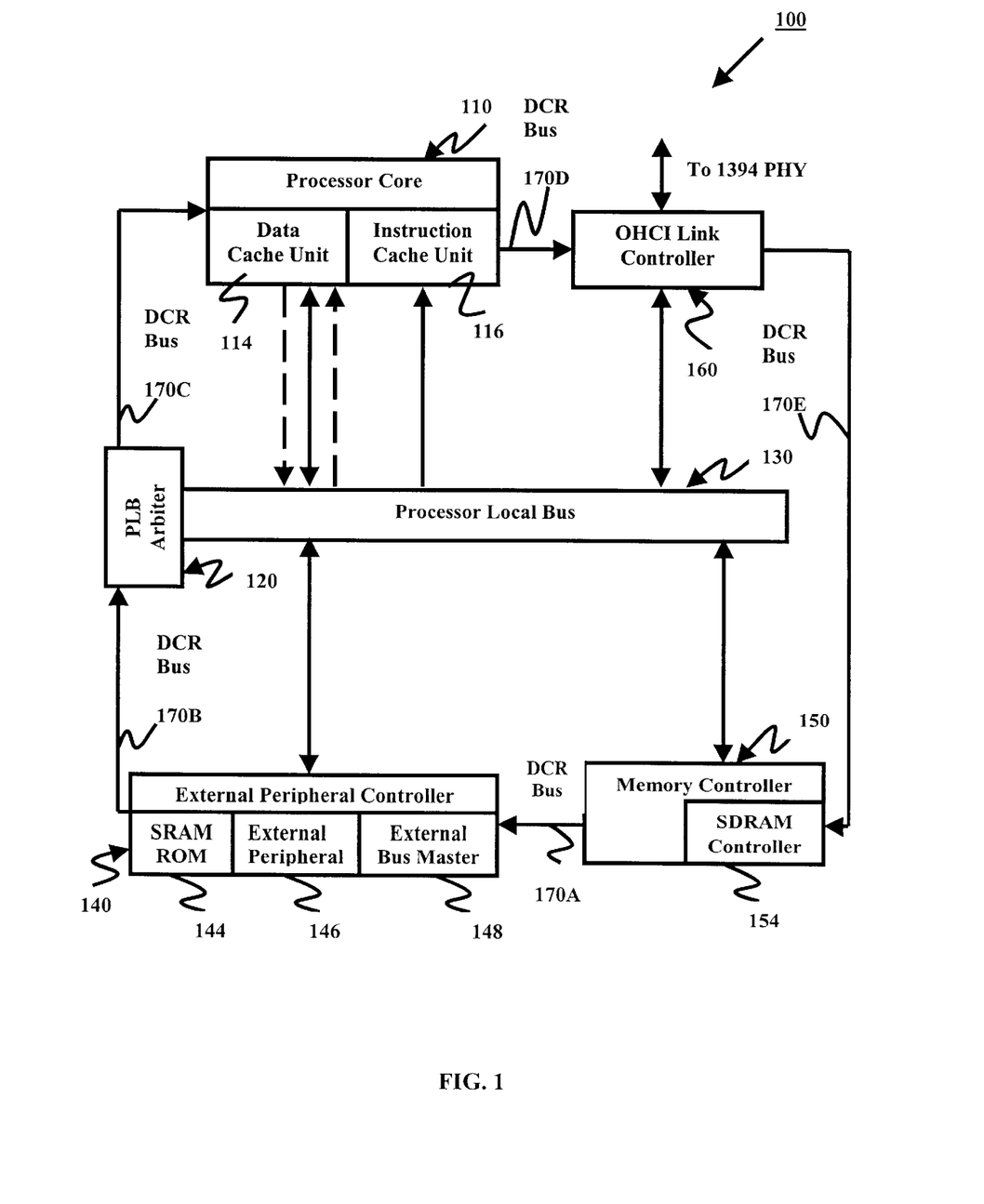
FIG. 1 is a block diagram of a portion of a system-on-a-chip (SOC) having a processor local bus (PLB) architecture, with which the embodiments of the invention can be practiced.

FIG. 1 is a block diagram illustrating an implementation of the PLB system 100 with which embodiments of the invention can be practiced. The system 100 includes a processor local bus 130, a processor core 110, a PLB arbiter 120, an external peripheral controller 140, and a memory controller 150. Also, the system 100 has another master, which can be an OHCI link controller 160, for example. The OHCI link controller 160 couples the processor local bus 130 to 1394 PHY. IEEE 1394 is a serial communication protocol, and PHY is the Physical layer interface of the protocol. The PLB arbiter 120 is directly coupled to the processor local bus 130. The processor core 110 also includes a data cache unit 114 and an instruction cache unit 116. The data cache unit 114 is bi-directionally coupled with the processor local bus 130, as indicated by the double headed arrow between the two. The instruction cache unit 116 is uni-directionally coupled to the processor local bus 130, as indicated by the single headed arrow extending from the processor local bus 130 to the instruction cache unit 116.

The external peripheral controller 140 is bi-directionally coupled with the processor local bus 130, as indicated by the double headed arrow extending between the two. This controller 140 includes an SRAM/ROM 144, an external peripheral 146, and an external bus master 148.

The memory controller 150 is also bi-directionally coupled to the processor local bus 130, as indicated by the double headed arrow extending between the two. The memory controller 150 includes an SDRAM controller 154. The memory controller 150, the external peripheral controller 140, the PLB arbiter 120, and the processor core 110 are also interconnected by means of a ring-like device control register (DCR) bus 170. For example, the DCR bus 170C extends between the PLB arbiter 120 and the processor core 110, as indicated by a single headed arrow extending from the PLB arbiter 120 to the processor core 110. In a similar manner the DCR bus 170A extends from the memory controller 150 to the external peripheral controller 140, and in turn 170B from the latter 140 to the PLB arbiter 120. The DCR loop is completed with bus segments 170D and 170E.

The instruction cache unit 116 only performs reads from memory, so the unit 116 requests read transfers only as indicated by the unidirectional arrow. The data cache unit 114 performs read and write operations on the PLB 130, as indicated by the bi-directional arrow.

Figure 2:
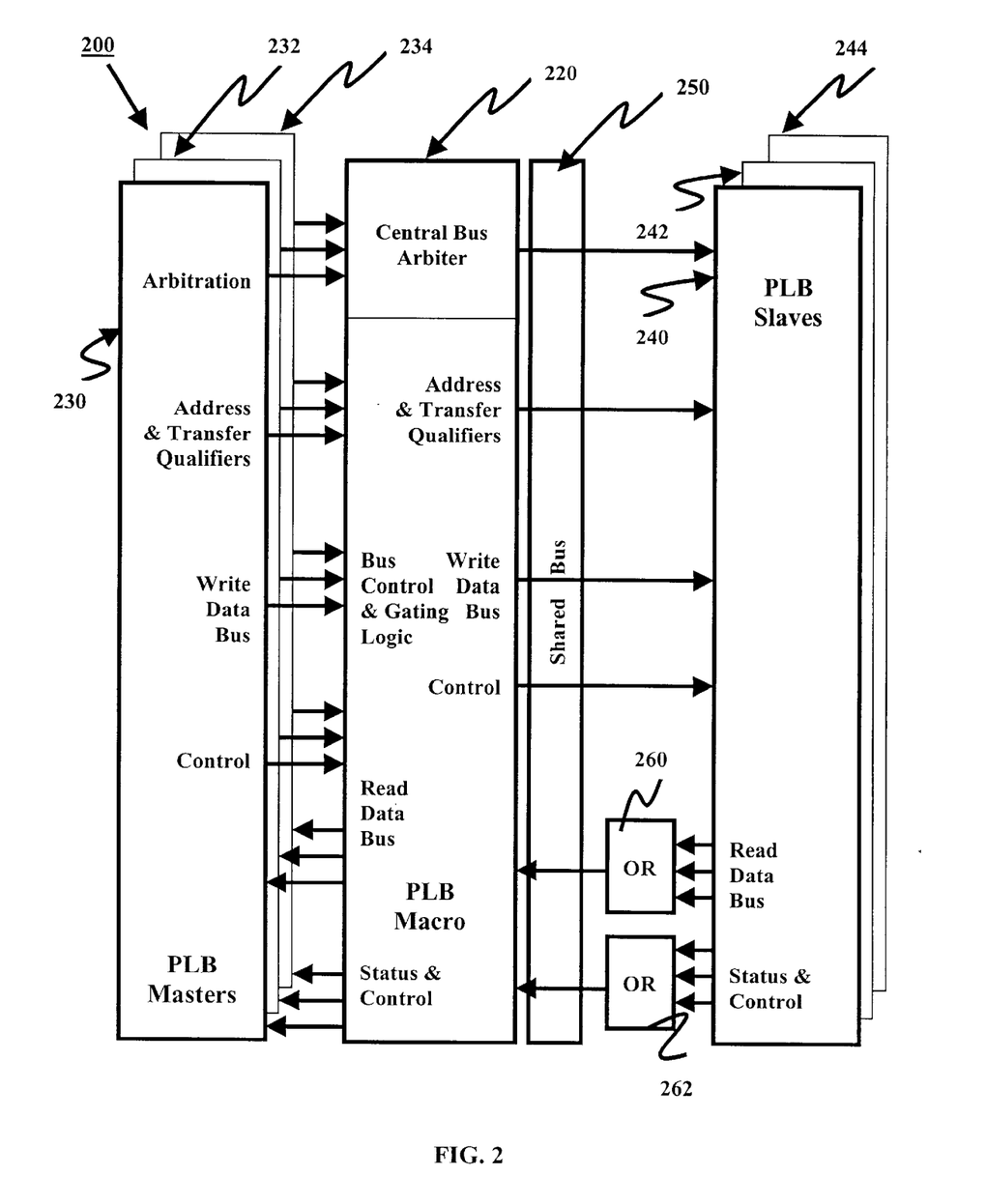
FIG. 2 is a block diagram illustrating further details of an example of PLB interconnections of FIG. 1 between PLB masters and slaves via a PLB macro or core.

The coupling of masters and slaves is shown in greater detail in FIG. 2. The configuration 200 shown in FIG. 2 includes three PLB masters 230, 232, and 234 coupled to the arbiter 220. In turn, the arbiter 220 is coupled via a shared bus 250 to three PLB slaves 240, 242 and 244. The number of slaves and the number of masters can be varied without departing from the scope and spirit of the invention. Only one master 230 and one PLB slave 240 is shown in detail, to simplify the drawings. However, it will be appreciated by those skilled in the art that the details of the master 230 and the PLB slave 240 apply equally to the other masters and slaves, respectively.

The arbiter 220 includes a central bus arbiter and a PLB macro. An arbitration signal (Request by Master) extends from the PLB master 230 to the central bus arbiter of the arbiter 220. Likewise, address and transfer qualifiers, the write data bus, and control logic extend from the PLB master 230 to the bus control in gating logic of the arbiter 220. The arbiter 220 also provides a read data bus to the PLB master 230 and status and control information. The read data bus and status and control signals of the PLB slaves 240, 242 and 244 are coupled via "OR" gates 260 and 262 through the shared bus 250 to the PLB macro of the arbiter 120 (220). In turn, the arbiter 120 (220) provides address and transfer qualifiers, a write data bus, and control signals to the PLB slaves 240, 242 and 244.

Figure 3:
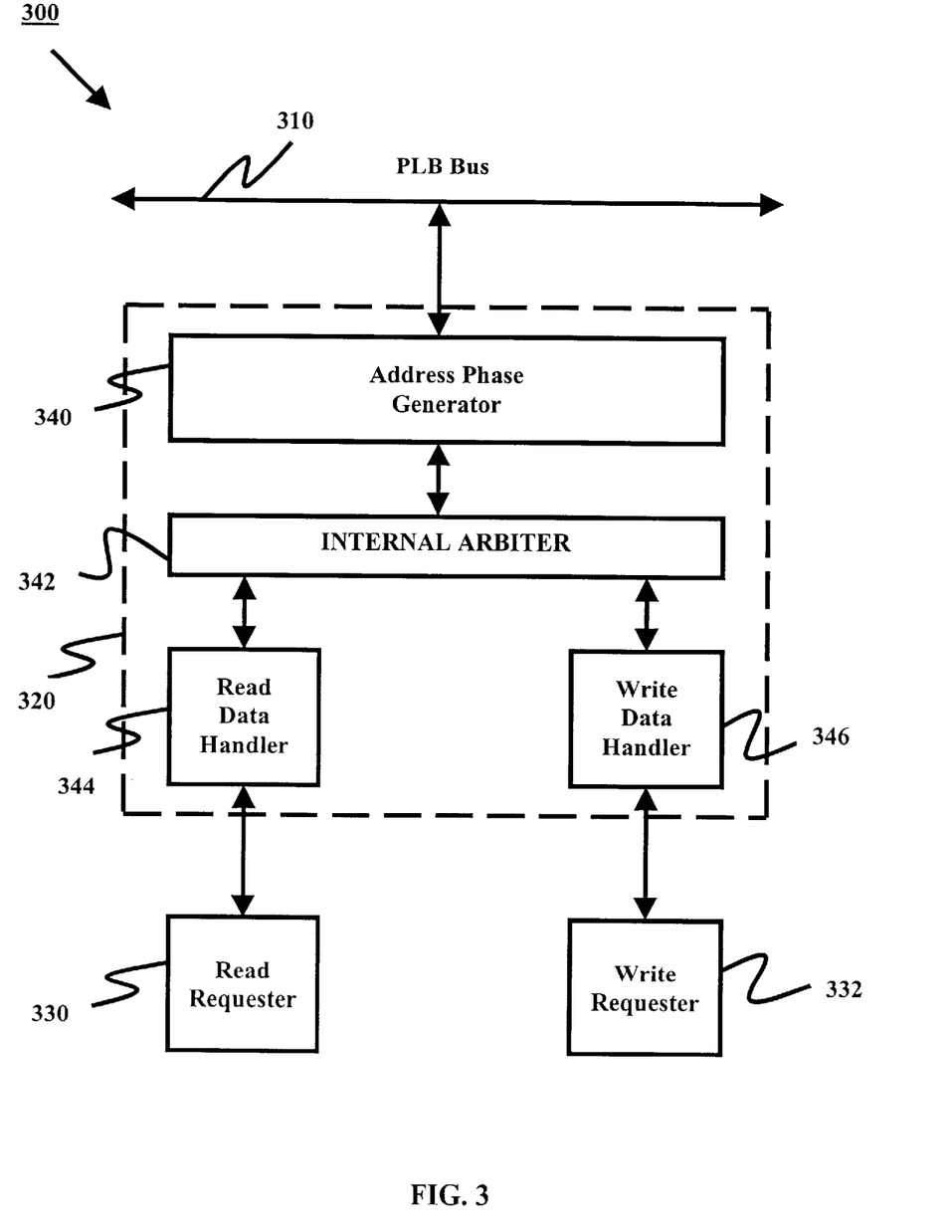
FIG. 3 is a block diagram illustrating a single master coupled to the PLB of FIGS. 1 and 2.

FIG. 3 is a block diagram illustrating a single master 300 that can be used to implement a PLB master of FIGS. 1 and 2. The single master 300 is coupled to the PLB 310. The master 300 includes an address phase generator 340 and an internal arbiter 342. The master 300 also includes read data handler 344 and a write data handler 346. Further, the master 300 has a read requester 330 and a write requester 332. The address phase generator 340, the internal arbiter 342, and the read and write data handlers 344, 346 are preferably implemented as a single module 320 as indicated by dashed lines.

The read data handler 344 and the write data handler 346 are bi-directionally coupled to the internal arbiter 342, which in turn is coupled to the address phase generator 340. The read data handler 344 is in turn bi-directionally coupled to the read requester 330. Likewise, the write data handler 346 is bi-directionally coupled to the write requester 332.

With reference to FIG. 3, if a macro or core connected to the PLB 310 wants to perform a read or write operation, the macro or core passes a request through the read requester 330 or the writer requester 332. Eventually, these two requests are arbitrated by the internal arbiter 342 and passed as one request towards the address phase generator 340. Because the address phase generator 340 can handle only one request at a time, the read data handler 344 and the write data handler 346 are used when the data phase is in progress to handle read and write data.

Figure 4:
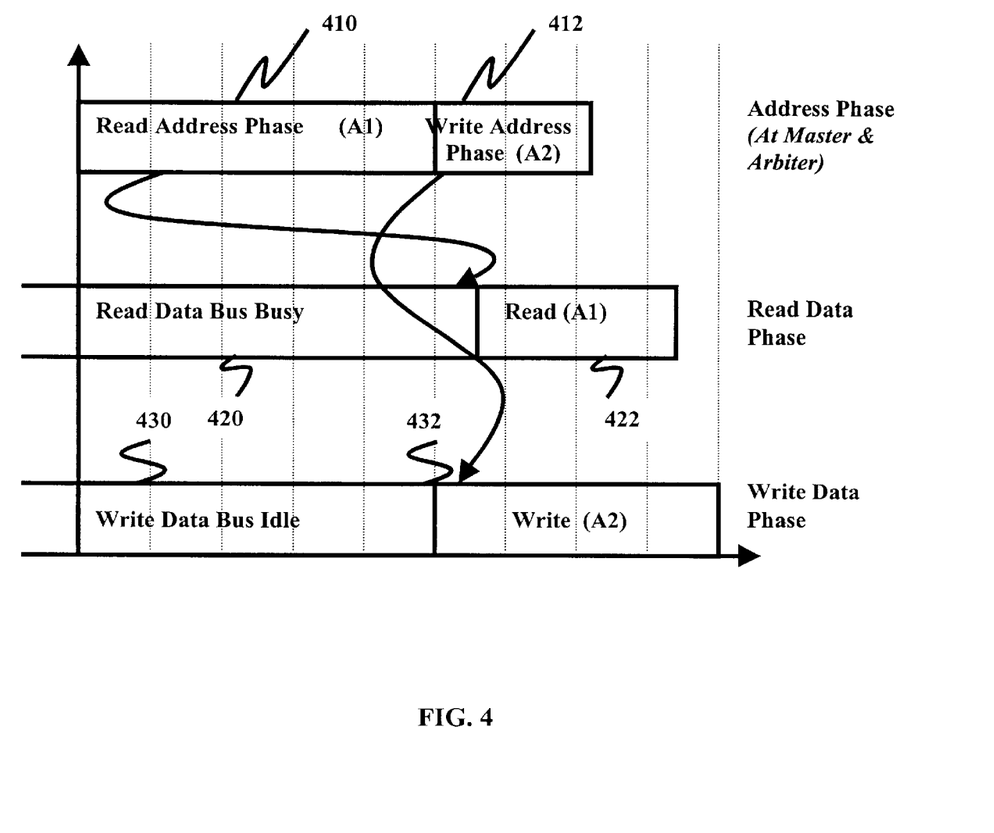
FIG. 4 is a timing diagram showing a first approach to handling read and write address phases of the PLB using the single master of FIG. 3.

FIG. 4 is a timing diagram illustrating the method of handling read and write operations on the PLB 130 using the master 300 of FIG. 3. Initially a read address phase (A1) 410 is begun before a write address phase (A2) 412 in the address phase at the master and arbiter. As shown in the example, the read data bus is busy 420 initially in the read data phase. The read data phase for (A1) 422 is performed after the read address phase 410 is acknowledged and the read data bus has become available. When with the read data bus is busy 420, the write data bus is idle 430. However, the write (A2) operation 432 cannot be performed in the write data phase until after the read address phase 410 is completed despite the fact that the write data bus is idle 430.

Thus, FIG. 4 shows the case when the master 300 wants to perform a read operation at address A1 and a write operation at address A2. Since the read data bus is busy 420 and not able to pipeline, the master 300 does not get an address acknowledgment. The master 300 cannot put a new address phase for write 412 before completing the address phase for read 410. Consequently, a single PLB master 300 cannot request a read and a write simultaneously. If the PLB master 300 wants to do both read and write transfers, the PLB master 300 requests a read first. If the read data bus is busy, the read request may or may not get acknowledged immediately. In that case, the write transfer suffers unnecessarily and vice versa.

The embodiments of the invention involve splitting a master into two, one part performing read operations and the other performing write operations. This can be easily done if an existing implementation of a chosen PLB core can support another master. This approach removes the bottleneck of the address phase (request phase) for a single master that wants to perform read and write at the same time.

Thus, for example with reference to FIG. 1, if the OHCI link controller 160 (or another master) is keeping the read bus of the PLB 130 busy, instead of waiting for a read grant, the data cache unit 114 in accordance with the embodiments of the invention can start a write operation if the dual master is implemented.

Further, with reference to FIG. 2, if the PLB core 220 can support 4 masters, one of these three masters 230, 232, and 234, which needs to perform read and write operations at the same time, can be split into two masters. One of the masters can perform a read operation and another perform a write operation in accordance with the embodiments of the invention.

Figure 5:
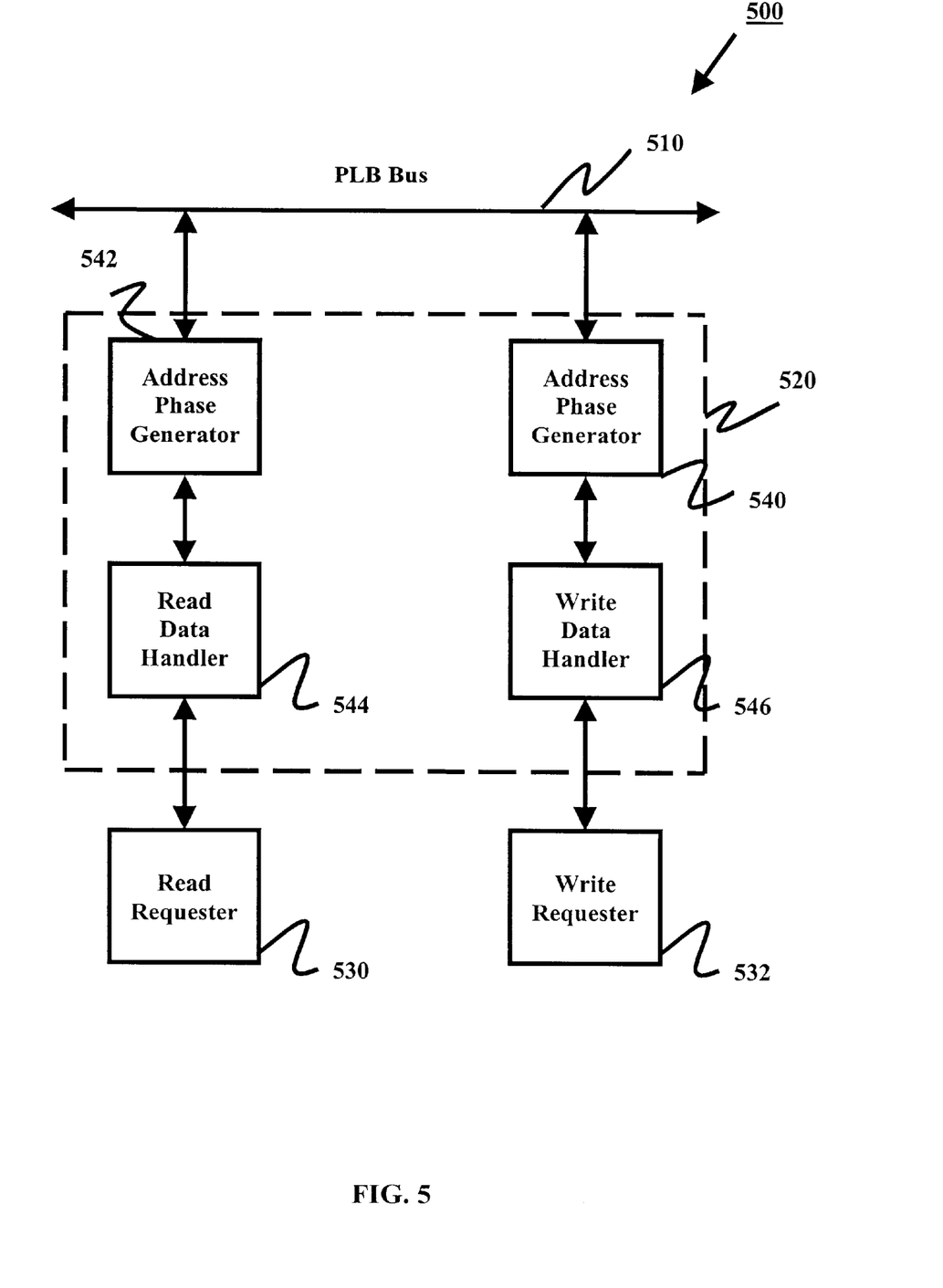
FIG. 5 is a block diagram of a dual master coupled to the PLB of FIGS. 1 and 2 in accordance with the first embodiment of the invention.

FIG. 5 is a block diagram of a dual master 500 in accordance with the first embodiment of the invention. The dual master 500 includes a read requester module 530, a write requester module 532, a read data handler module 544, a write data handler module 546 and two address phase generators 540, 542, which have the same functionality as address generator 340 of FIG. 3. The address phase generators 540, 542 and the read and write data handlers 544, 546 are preferably implemented in a single module 520 as indicated by the dashed lines. The configuration of the dual master 500 is similar to that of the single master 300 of FIG. 3 except that the address phase generator is now implemented as two modules 540, 542, which are respectively coupled to the write data handler 546 and the read data handler 544.

The embodiments of the invention are preferably implemented as a generic master interface that is capable of selectably implementing the single master mode of FIG. 3 (when necessary) and the dual master mode of FIG. 5. If a macro or core connected to the PLB 510 seeks to perform a read or write operation, the macro should pass a request through the read requester 544 or write requester 546. Each request is separately passed towards address phase generators 542 and 540. These two address phase generators are each the same as address phase generator 340. Read and write data handlers 544, 546 are used when the data phase is in progress to handle read and write data.

The master 500 is split into one performing read operations and another performing write operation. The master 500 can concurrently put both requests on the PLB 510. Instead of doing internal arbitration between read and write operations, the two master implementation allows the PLB arbiter 120 (220) to do arbitration, because the PLB arbiter 120 (220) has a full picture of PLB activity and can start read or write operations. The PLB arbiter 120 (220) grants the bus for a write operation, because the write data bus is idle. The master 500 is able to finish transfers faster. Thus, dual master 500 according to the first embodiment increases the system performance.

Thus, the generic master interface of FIG. 5 provides flexibility to the user to customize it as a dual master on the PLB 130, one master performing only read requests, and the other master performing only write requests from the device. The process of FIG. 4 (and the master 300 of FIG. 3) can be used when read and write requests do not come at same time, or there is some data dependency in read and write request and ordered transfers are required. However, in other circumstances, the dual master 500 can operate in accordance with the timing diagram of FIG. 6.

If the PLB core 130 of FIG. 1 can support one more master, the data cache unit 114 can be implemented as two masters, one performing read operations only and the other performing only write operations, in accordance with the embodiments of the invention. These operations are indicated by dashed arrows in FIG. 1. Instead of doing arbitration internally between read and write requests and putting one request on the PLB bus 130, the processor core 110 leaves this arbitration to PLB arbiter 120 if there is not a data dependency problem, using the embodiments of the invention.

Figure 6:
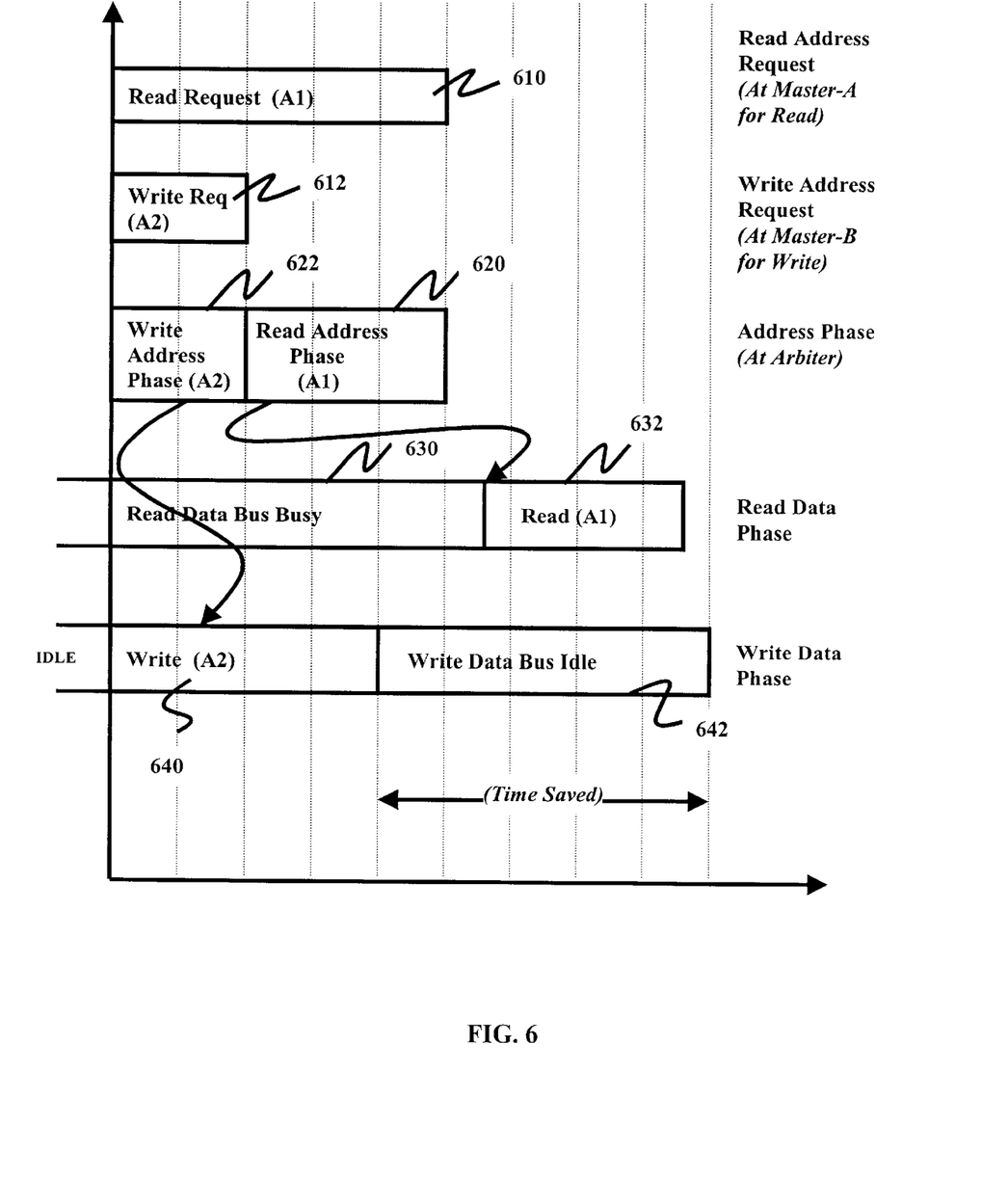
FIG. 6 is a timing diagram showing the approach of the dual master of FIG. 5 for handling read and write address phases of the PLB in accordance with the first embodiment of the invention.

FIG. 6 is a timing diagram illustrating operation of the dual master 500. With this embodiment, the first and second masters (master-A for a read operation and master-B for a write operation) can place a read request (A1) 610 and a write request (A2) 612 simultaneously on the PLB 130 for the read and write address requests. During the address phase at the arbiter, the write address phase (A2) 622 and then the read address phase (A1) 620 are performed. This occurs because the read data bus is busy 630 during the read data phase initially, while the write data bus is initially idle so that the write operation (A2) 640 can be performed while the read data bus is busy. The write data bus then becomes idle 642. The read operation (A1) 632 can be performed in the read data phase after the read data bus is no longer busy. In this manner, time can be saved in carrying out a write operation.

Components of the method for mastering a processor local bus (PLB) can be implemented as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

The method steps for mastering a processor local bus (PLB) can effected by instructions in the software that are carried out by a processing core. Again, the software may be implemented as one or more modules for implementing the method steps.

In particular, the software may be stored in a computer readable medium, including a storage device. A computer readable medium can store such software or program code recorded so that instructions of the software or the program code can be carried out. The processes of the embodiments can be resident as software or a computer readable program code recorded in the computer readable medium.

In the foregoing manner, a method, an apparatus and a computer program product for mastering a processor local bus (PLB) are disclosed. While only a small number of embodiments are described, it will be apparent to those skilled in the art in view of this disclosure that numerous changes and/or modifications can be made without departing from the scope and spirit of the invention.

We claim:

1. An apparatus for mastering a Processor Local Bus (PLB) having read and write data buses, said apparatus including:
   first means for generating a first address phase for read data coupled to said PLB;
   second means for generating a second address phase for write data coupled to said PLB, wherein said first and second address phase generating means are adapted to simultaneously process respective read and write requests, including simultaneously asserting the respective read and write requests to a PLB arbiter, and said first address phase generating means is adapted to carry out a write operation when said write data bus is idle independently of whether said read data bus is busy and said second address phase generating means is adapted to carry out a read operation when said read data bus is idle independently of whether said write data bus is busy.

2. The apparatus according to claim 1, further including:
   means for handling read data coupled to said first address phase generating means; and
   means for handling write data coupled to said second address phase generating means.

3. The apparatus according to claim 2, further including:
   means for requesting read data coupled to said read-data handling means; and
   means for requesting write data coupled to said write-data handling means.

4. A system on a chip, said system including;
   a processor local bus (PLB);
   an arbiter coupled to said PLB; and
   at least two masters coupled to said PLB, a first of said at least two master including:
      first means for generating a first address phase for read data coupled to said PLB;
      second means for generating a second address phase for write data coupled to said PLB, wherein said first and second address phase generating means are adapted to simultaneously process read and write requests, including simultaneously asserting the respective read and write requests to the PLB arbiter, and said first address phase generating means is adapted to carry out a write operation when said write data bus is idle independently of whether said read data bus is busy and said second address phase generating means is adapted to carry out a read operation when said read data bus is idle independently of whether said write data bus is busy.

5. The system according to claim 4, further including:
   means for handling read data coupled to said first address phase generating means; and
   means for handling write data coupled to said second address phase generating means.

6. The system according to claim 5, further including:
   means for requesting read data coupled to said read-data handling means; and
   means for requesting write data coupled to said write-data handling means.

7. A method for mastering a Processor Local Bus (PLB) having read and write data buses, said method including the steps of;
   generating a first address phase for read data coupled to said PLB;
   generating a second address phase for write data coupled to said PLB, wherein said first and second address phase generating steps simultaneously process read and write requests, including simultaneously asserting the respective read and write requests to a PLB arbiter, and carrying out a write operation when said write data bus is idle independently of whether said read data bus is busy and carry out a read operation when said read data bus is idle independently of whether said write data bus is busy.

8. The method according to claim 7, further including the steps of:
   handling read data coupled to said first address phase generating step; and
   handling write data for said second address phase generating step.

9. The method according to claim 8, further including the steps of:
   requesting read data for said read-data handling step; and
   requesting write data for said write-data handling step.

10. A method for providing a system on a chip, said system having a processor local bus (PLB), an arbiter coupled to said PLB, and at least two masters coupled to said PLB, said method including the steps of:
    generating a first address phase for read data provided via said PLB;
    generating a second address phase for write data provided via said PLB, wherein said first and second address phase generating steps simultaneously process read and write requests, including simultaneously asserting the respective read and write requests to a PLB arbiter, and carrying out a write operation when said write data bus is idle independently of whether said read data bus is busy and carrying out a read operation when said read data bus is idle independently of whether said write data bus is busy.

11. The method according to claim 10, further including the steps of:

handling read data for said first address phase generating step; and handling write data for said second address phase generating step.

12. The method according to claim 11, further including:

requesting read data for said read-data handling step; and requesting write data for said write-data handling step.

13. A computer program product having a computer readable medium having a computer program recorded therein for mastering a Processor Local Bus (PLB) having read and write data buses, said computer program product including:

computer program code means for generating a first address phase for read data via said PLB;

computer program code means for generating a second address phase for write data via said PLB, wherein said computer program code means for generating said first and second address phases are adapted to simultaneously process read and write requests, including simultaneously asserting the respective read and write requests to a PLB arbiter, and carrying out a write operation when said write data bus is idle independently of whether said read data bus is busy and carrying out a read operation when said read data bus is idle independently of whether said write data bus is busy.

14. The computer program product according to claim 13, further including:

computer program code means for handling read data for said computer program code means for generating said first address phase; and computer program code means for handling write data coupled to said computer program code means for generating said second address phase.

15. The computer program product according to claim 14, further including:

computer program code means for requesting read data; and computer program code means for requesting write data.

16. A computer program product having a computer readable medium having computer program recorded therein for providing a system on a chip, said computer program product including:

computer program code means for providing a processor local bus (PLB);

computer program code means for providing an arbiter coupled to said PLB; and computer program code means for providing at least two masters coupled to said PLB, a first master of said at least two masters including:

first means for generating a first address phase for read data coupled to said PLB;

second means for generating a second address phase for write data coupled to said PLB, wherein said first and second address phase generating means are adapted to simultaneously process read and write requests, including simultaneously asserting the respective read and write requests to the PLB arbiter, and carrying out a write operation when said write data bus is idle independently of whether said read data bus is busy and carry out a read operation when said read data bus is idle independently of whether said write data bus is busy.

17. The computer program product according to claim 16, wherein said first master further includes:

means for handling read data coupled to said first address phase generating means; and means for handling write data coupled to said second address phase generating means.

18. The computer program product according to claim 17, wherein said first master further includes:

means for requesting read data coupled to said read-data handling means; and means for requesting write data coupled to said write-data handling means.

* * * * *